(12) United States Patent
Wang et al.

(10) Patent No.: US 10,048,859 B2
(45) Date of Patent: Aug. 14, 2018

(54) DISPLAY AND MANAGEMENT OF APPLICATION ICONS

(71) Applicant: Alibaba Group Holding Limited, George Town (KY)

(72) Inventors: Shaoguo Wang, Hangzhou (CN); Xuchen Hang, Hangzhou (CN); Hongxing Wu, Beijing (CN)

(73) Assignee: Alibaba Group Holding Limited (KY)

( * ) Notice: Subject to any disclaimer, the term of this patent is extended or adjusted under 35 U.S.C. 154(b) by 289 days.

(21) Appl. No.: 14/817,803

(22) Filed: Aug. 4, 2015

(65) Prior Publication Data

US 2016/0041719 A1 Feb. 11, 2016

(30) Foreign Application Priority Data

Aug. 5, 2014 (CN) .......................... 2014 1 0381308

(51) Int. Cl.
| G06F 3/048 | (2013.01) |
| G06F 3/0488 | (2013.01) |
| G06F 3/0481 | (2013.01) |
| G06F 3/0482 | (2013.01) |

(52) U.S. Cl.
CPC ........ G06F 3/04883 (2013.01); G06F 3/0481 (2013.01); G06F 3/0482 (2013.01)

(58) Field of Classification Search
None
See application file for complete search history.

(56) References Cited

U.S. PATENT DOCUMENTS

| 7,519,918 | B2 | 4/2009 | Trantow |
| 7,587,684 | B2 | 9/2009 | Perttula |
| 2005/0091672 | A1 | 4/2005 | Debique et al. |
| 2008/0052642 | A1 | 2/2008 | Champion et al. |
| 2009/0319947 | A1 | 12/2009 | Wang et al. |
| 2010/0313164 | A1 | 12/2010 | Louch et al. |
| 2012/0017176 | A1* | 1/2012 | Choi .................. G06F 3/04886 715/825 |
| 2012/0192078 | A1 | 7/2012 | Bai et al. |
| 2012/0297341 | A1 | 11/2012 | Glazer et al. |
| 2013/0024794 | A1* | 1/2013 | Ha ........................ G06F 3/0485 715/765 |
| 2013/0278527 | A1 | 10/2013 | Hollmans et al. |
| 2014/0075389 | A1 | 3/2014 | Kim |
| 2014/0152597 | A1* | 6/2014 | Lee ....................... G06F 3/0416 345/173 |
| 2014/0191979 | A1 | 7/2014 | Tsudik |

FOREIGN PATENT DOCUMENTS

WO 2014106240 7/2014

* cited by examiner

*Primary Examiner* — Thanh Vu (74) *Attorney, Agent, or Firm* — Van Pelt, Yi & James LLP (57) ABSTRACT

Application icon management includes displaying a first set of one or more application icons in a desktop display area; receiving a command; in the event that a second set of one or more application icons in an icon display area is displayed and the command corresponds to a hide command, hiding the icon display area such that the second set of one or more application icons is not displayed; and in the event that the second set of one or more application icons in the icon display area is not displayed and the command corresponds to a display command, displaying the second set of one or more application icons in the icon display area.

21 Claims, 7 Drawing Sheets

DISPLAY AND MANAGEMENT OF APPLICATION ICONS

CROSS REFERENCE TO OTHER APPLICATIONS

This application claims priority to People's Republic of China Patent Application No. 201410381308.5 entitled A METHOD AND DEVICE FOR PROVIDING APPLICATION ICONS, filed Aug. 5, 2014 which is incorporated herein by reference for all purposes.

FIELD OF THE INVENTION

The present application involves the field of computer technology; in particular, it involves user interface displays.

BACKGROUND OF THE INVENTION

With the continuous development of computer technology and network technology, users are already able to obtain a variety of services by installing various applications on terminals. For example, a user can install a variety of applications on his/her mobile telephone, enabling him/her to obtain various services at any time and any place.

Currently, the terminal desktop is the point of entry to launch these various applications, and the icons for each of the various applications installed are displayed on the desktop. The user needs to click the icon of an application to obtain the services offered by that application.

However, in existing systems, the number of applications installed on the terminal by the user is often relatively large, therefore, when the user needs a certain application, it is often difficult for the user to locate the icon of the desired application among the many application icons. The user sometimes must invoke a search function to find the desired application. A more user-friendly and convenient way of managing the application icons is needed.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique of modifying a desktop display to simplify application icon management and provide greater user privacy is disclosed. In some embodiments, a first set of application icons is displayed in a desktop display area. Further, an icon display area is used to display a second set of application icons. When a terminal receives a hide command, it hides the icon display area and the second set of application icons. Application icons can be added to the icon display area, so that when the user needs to use this application, the corresponding icon can be found in this icon display area, thus increasing the speed of access and improving usability.

Figure 1:
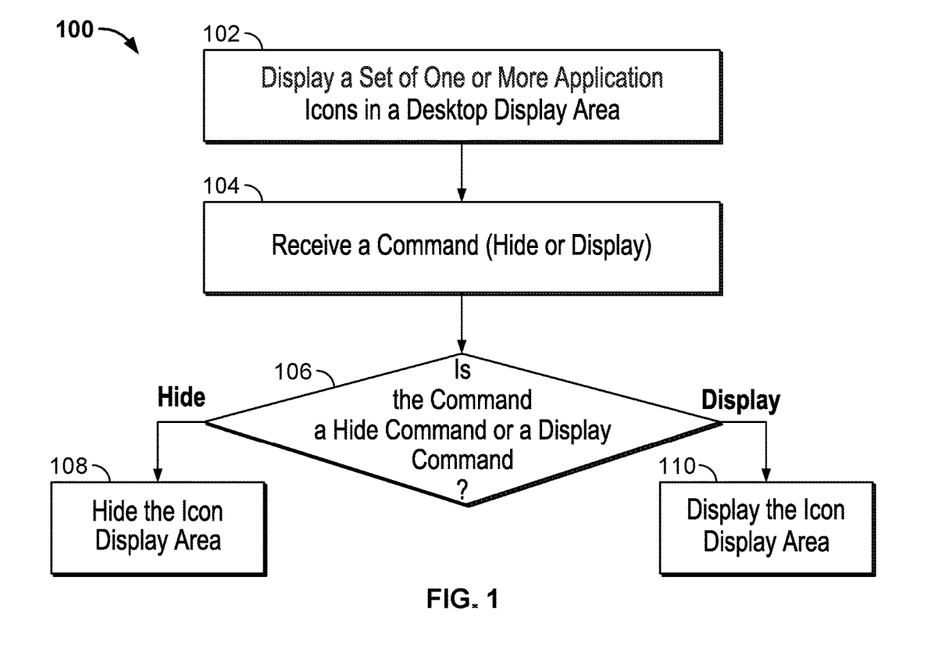
FIG. 1 is an embodiment of a process of modifying a desktop to display application icons.

FIG. 1 is an embodiment of a process of modifying a desktop to display application icons. Process 100 can be performed on a terminal such as 700 of FIG. 7. In the following discussion, the various functions performed by the terminal can be implemented as a part of the terminal's operating system, or as an application executing within the operating system.

Initially, at 102, a set of one or more application icons is displayed in a desktop display area. In most graphical user interface-based operating systems, the terminal will display in an output screen in the desktop display area icons representing applications that are available to be invoked by the user.

At 104, a command to change the desktop display area is received.

At 106, it is determined whether the command is a hide command or a display command.

As will be described in further detail below, in some embodiments, an icon display area that is different from the desktop display area can be used to display certain application icons (e.g., icons for frequently used applications, icons for applications the user would like to keep private, etc.). Thus, in some embodiments, a user can enter a hide command to hide the icon display area on the terminal by performing a pre-specified operation that meets a first designated condition. Specifically, the operating system of the terminal monitors the operations of the user. When a monitored user operation satisfies a first designated condition, it is determined that a hide command has been received. At 108, the icon display area is hidden such that the set of application icons associated with the icon display area is not displayed.

The user can also enter a display command on the terminal by performing a pre-specified operation that meets a second designated condition. When the terminal receives a display command, it will display the icon display area that is different from the desktop display area. The icons in the icon display area correspond to certain specially designated applications. They can be icons for frequently used applications, applications that the user would like to keep private, etc. Specifically, the terminal monitors user operations using the operating system. When the operating system detects that a user operation satisfies a second designated condition, then it is determined that a display command has been received. At 110, the set of one or more application icons in the icon display area is displayed.

Figure 3:
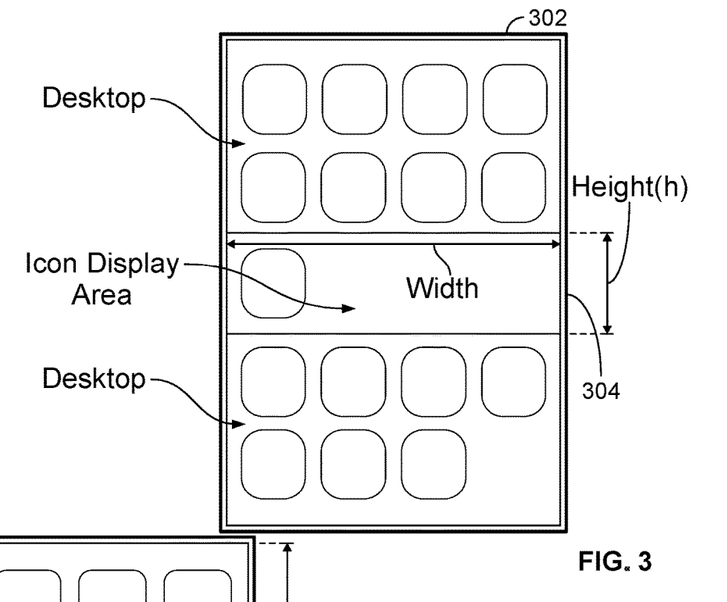
FIG. 3 is a schematic diagram of an example icon display area according to some embodiments.

For purposes of example, the description below describes in detail a terminal that is a touch screen device such as a touch screen smartphone or a touch screen tablet that employs surface capacitive or projected capacitive touch technology to receive inputs from the user. Other terminals and input technologies can be used. In this case, the touch screen device's operating system continuously monitors the operations executed by the user, and identifies a pre-specified operation that satisfies a first designated condition as the hide command, or a pre-specified operation that satisfies a second designated condition as the display command. For example, the pre-specified operation corresponding to the hide command can be a two-point hand gesture operation such as placing two fingertips on the touch screen and pinching the fingertips across the touch screen, and the first designated condition is that the difference between the distance of the initial placement positions (specifically the placements of the user's two fingertips) and the distance of the ending placement positions does not exceed a first set threshold value. In some embodiments, rather than the absolute distances, the first designated condition depends on the vertical or horizontal distances. For example, when it is determined that the difference obtained by subtracting the vertical distance between the initial positions of the two placements from the vertical distance between the ending positions of the two placements does not exceed a first set threshold value, it is further determined that the user operation perceived through monitoring satisfies a first designated condition. In some embodiments, the first set threshold value described in the embodiments of the present application can be set according to implementation requirements; for example, it can be set as $-\frac{1}{2}h$, where h is the height of the icon display area, as shown in FIG. 3.

Figure 2:
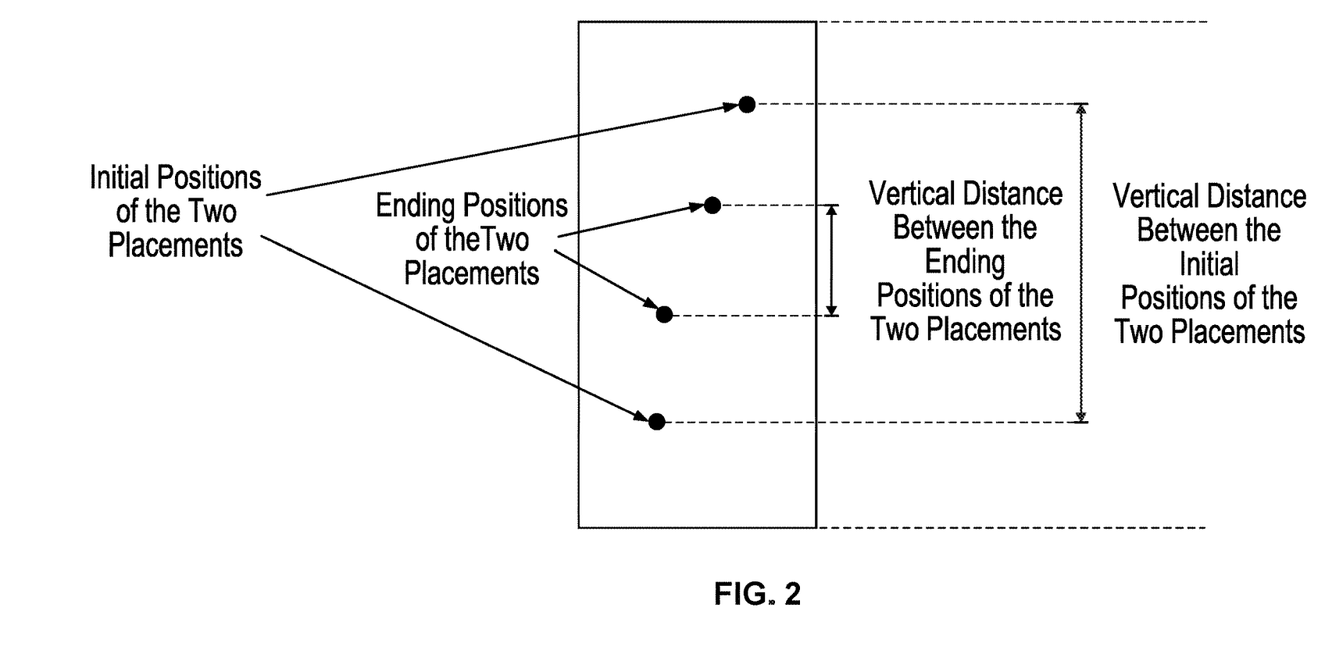
FIG. 2 is a schematic diagram illustrating an example of a user entry of a hide command on the touch screen device.

FIG. 2 is a schematic diagram illustrating an example of a user entry of a hide command on the touch screen device. In this example, the operating system of the device monitors the user's touch operations constantly in real time; whenever the operating system determines through monitoring that the user has executed a touch operation, a touch event corresponding to this touch operation is recorded at a predetermined location in memory or storage, and another part of the operating system or a different application executing on the touch screen device can retrieve the touch events recorded by checking at the predetermined location for recorded touch events. When a recorded event is found, the first designated condition is checked.

When the user performs a pre-specified two-point gesture operation on this touch screen device such as placing two fingertips on the screen and pinching the fingers together, the vertical distance between the ending positions of the two screen placements of the fingertips is less than the vertical distance between the initial positions of the two fingertips' placements. Therefore, based on the touch event retrieved from the operating system in real time, if this touch screen device determines that the user has employed a two-point hand gesture, and the difference obtained by subtracting the vertical distance between the initial positions of the two placements from the vertical distance between the ending positions of the two placements is less than a first set threshold value, then it can be determined that the user operation perceived through monitoring satisfies the designated condition, i.e., it can be determined that a hide command entered by the user has been received.

In some embodiments, the icon display area is implemented as a container class (e.g., the container class as specified by Google API for Android®) that stores and displays icons. In some implementations, the terminal's desktop is implemented as a container class used to store and display icons, and the container class corresponding to the icon display area is implemented as a subclass of the container class corresponding to the desktop. In other words, in such implementations, for the icon display area, the software code defines a container class used to store and display icons, and this container class is also a subclass in the container class corresponding to the desktop. Thus, the operating system or the desktop application implements rendering and other functions associated with the desktop class, allowing the user to store an icon in the relatively larger container class of the desktop. The operating system or the desktop application further implements rendering and other functions associated with the icon display area, thus allowing the user to store an icon in the container class of the icon display area and add an application icon to the icon display area.

In various embodiments, the icon display area serves different functions depending on different requirements; some example functions are described below.

The first function of the icon display area is to store the icons of frequently-used applications, i.e., the user is permitted to store the icons of frequently-used applications in the icon display area; in this way, when the user wants to use an application, the icon for this application can be found directly in the icon display area, effectively increasing the speed of user operations as well as making it more convenient for the user to perform the operations. The icon display area is the equivalent of a shortcut area, and the application icons stored in this icon display area are shortcut application icons. When the items stored in this icon display area are shortcut application icons, these shortcut application icons can only be displayed in this icon display area, or they can be simultaneously displayed on the desktop and in this icon display area in order to make them easy for the user to find these icons.

The second function of the icon display area is to store the icons of applications that a user does not wish others to see. A user may not want others to see certain of the user's own applications for privacy reasons. Thus, the icons of these applications can be added to the icon display area, and a hide command can be entered; the desktop application then hides this icon display area, i.e., does not display this icon display area, thereby achieving the objective of protecting the user's privacy; now, the icon display area is the equivalent of a hidden area, and the icons stored in this icon display area are hidden application icons. Wherein, when the items stored in this icon display area are hidden application icons, these hidden application icons are icons for which display on the desktop is hidden, i.e., icons that are not displayed on the desktop.

Further, when this icon display area contains both hidden application icons and shortcut application icons, in order to distinguish these two different types of icons in this icon display area, the terminal can use a variety of methods to distinguish hidden application icons and shortcut application icons.

In some embodiments, different types of identifiers with different display properties are used to distinguish hidden application icons and shortcut application icons. For example, hidden application icons are semi-transparent in appearance and shortcut application icons are normal in appearance; or special markings such as characters or indicators can be added to the icons of hidden applications to indicate that they are hidden or are shortcuts.

In some embodiments, hidden application icons and shortcut application icons are displayed in different areas of the icon display area. For example, hidden application icons are displayed on the left side of this icon display area, and shortcut application icons are displayed on the right side.

Further, if, in addition to including the hidden application icon type and the shortcut application icon type, the icon display area described in the embodiments of the present application is also able to include icons of other types (such as office type application icons such as file folders, files, etc.), the techniques described above can also be used to distinguish the various types of icons in the icon display area. In some embodiments, the various types of icons in the icon display area are not distinguished by their markings.

In some embodiments, the icon display area can be located in a designated position on the desktop, the width of this icon display area can be the same as a width not greater than the desktop, and the height of the icon display area can be less than the height of the desktop, as shown in FIG. 3.

FIG. 3 is a schematic diagram of an example icon display area according to some embodiments. FIG. 3 is described using the example where the terminal is a touch screen device. In FIG. 3, desktop area 302 is configured to display regular application icons. Icon display area 304 is located in the central portion of the desktop. Icon display area 304's width is approximately the same as the desktop width, i.e., the same as the width of the terminal display screen, and its height is less than the height of the desktop. In FIG. 3, the height of the icon display area is slightly greater than the height of an icon.

In this example, when it is perceived through monitoring that the user has employed a two-point hand gesture operation such as placing two fingertips on the touch screen and spreading the fingertips across the touch screen, and the difference obtained by subtracting the distance between the initial positions of the two placements from the distance between the ending positions of the two placements is not less than a second set threshold value (specifically the placements of the user's two fingertips), it is determined that the user operation satisfies a second designated condition. Thus, it is determined that a display command entered by the user has been received. In some embodiments, the second set threshold value can be set as h, where h is the height of this icon display area.

In some embodiments, the initialized state of the container class that serves as the icon display area is preset to the hidden state. In other words, upon initialization, the icon display area is hidden from view and not displayed on the desktop. The icon display area is displayed when a display command entered by the user is received. Once the icon display area appears on the desktop, the user can add an application icon (which can be an application icon or a shortcut application icon) to the displayed icon display area, or click/tap on a certain icon in the icon display area to invoke the corresponding application. When the terminal is displaying the icon display area, if a hide command entered by the user is received, then the operating system hides this icon display area as well as the application icons placed within the icon display area.

Preferably, the user can also preset a password associated with the icon display area. Upon receipt of a display command, the operating system of the terminal first prompts the user to enter the password, and verifies whether the password entered by the user is correct; if the password is correct, the operating system then displays the icon display area; otherwise, the operating system keeps this icon display area hidden.

In practice, wallpaper images are stored in the majority of terminal desktops. If no changes occur to the wallpaper as the result of the display of the icon display area, the behavior can lead to user confusion; however, because wallpaper is controlled by the operating system, the icon display area has no direct control over wallpaper. To solve this problem, in some embodiments, when the terminal displays the icon display area, the operating system can first retrieve the desktop wallpaper data and draw a wallpaper image based on the retrieved wallpaper data, then scale the drawn wallpaper image to the desktop dimensions as needed, and, based on the position on the desktop of the designated horizontal line in the icon display area, determine a first straight line in a corresponding position in the scaled wallpaper image. The scaled wallpaper image is then divided into two sub-wallpaper images using the determined first straight line as the dividing line, and the desktop is divided into two sub-desktops using the designated horizontal line in this icon display area as the dividing line. The sub-wallpaper image located in the upper portion is used as the wallpaper of the sub-desktop located in the upper portion, and the sub-wallpaper image located in the lower portion is used as the wallpaper of the sub-desktop located in the lower portion. The sub-desktop located in the upper portion and its wallpaper are moved upward and the distance by which they are moved upward being the distance from this designated horizontal line to the upper border of the icon display area. In some embodiments, optionally or alternatively, the sub-desktop located in the lower portion and its wallpaper are moved downward, the distance by which they are moved downward being the distance from this designated horizontal line to the lower border of the icon display area, to display the icon display area located between the two sub-desktops. When the designated horizontal line is the upper border of this icon display area, the distance between this designated horizontal line and this upper border is 0; therefore, it is only necessary to move the sub-desktop located in the lower portion and its wallpaper downward.

Similarly, when the designated horizontal line is the lower border of this icon display area, the distance between this designated horizontal line and this lower border is 0, and therefore it is only necessary to move the sub-desktop located in the upper portion and its wallpaper upward.

Figure 4A:
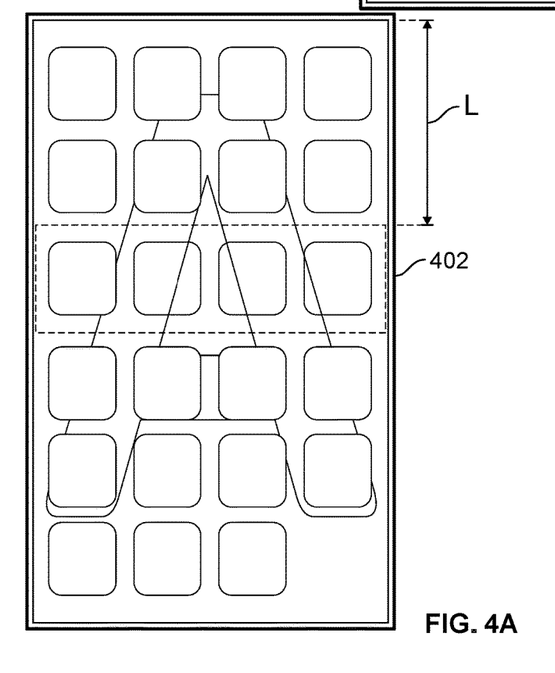
FIGS. 4A through 4C are diagrams illustrating an example where the upper border of the icon display area is the designated horizontal line.
Figures 4B, 4C:
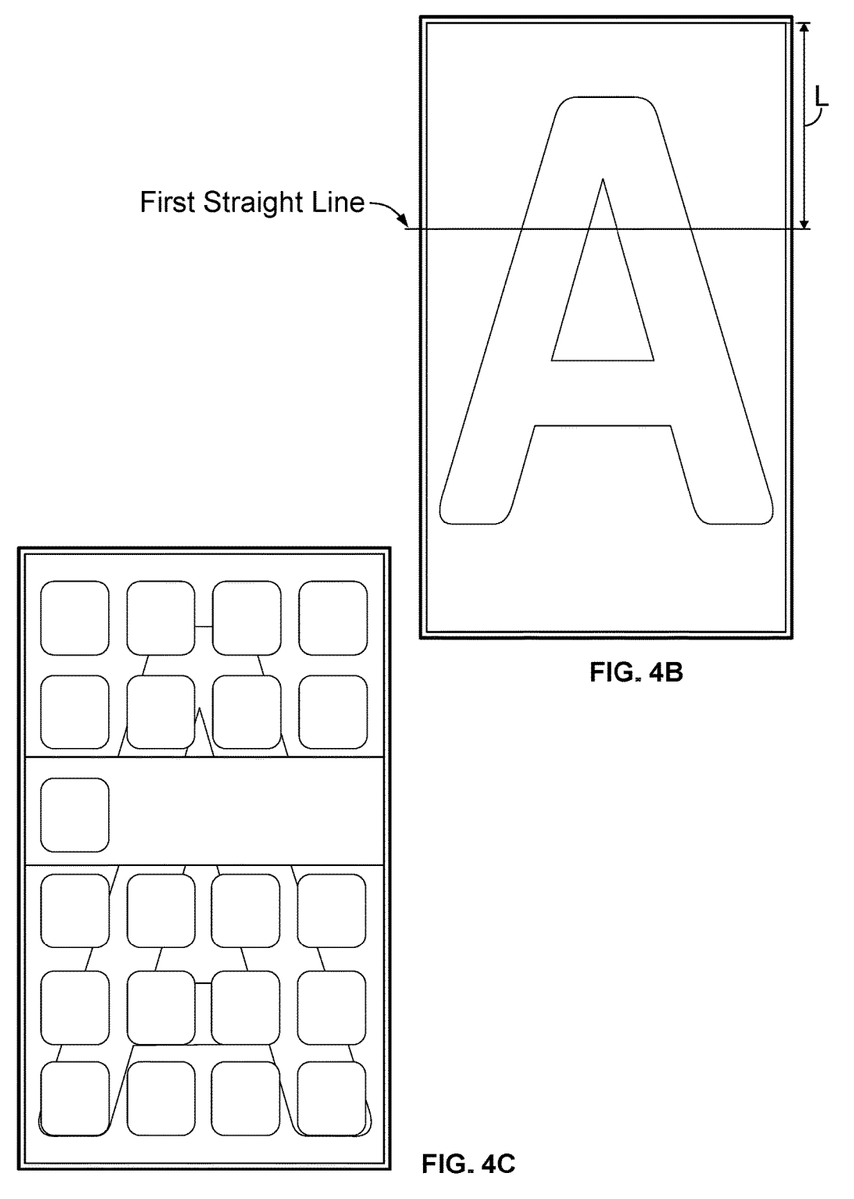

FIGS. 4A through 4C are diagrams illustrating an example where the upper border of the icon display area is the designated horizontal line.

FIG. 4A is a display screen of an example terminal when the terminal is not displaying the icon display area. In FIG. 4A, the terminal has already hidden the icon display area so that the icon display area is not shown. Assuming the wallpaper of the desktop is the letter "A," the icon display area is located in the central portion of the desktop (area 402 which is surrounded by the dotted line in FIG. 4A). This location can be a default location for the icon display area. When the operating system of the terminal receives a display command entered by the user to display the icon display area, wallpaper data is retrieved from the operating system's screen display buffer, and, based on the wallpaper data, a new wallpaper image can be drawn (rendered) on the display. The drawn wallpaper image is then scaled to the dimensions of the desktop to obtain the wallpaper image as shown in FIG. 4B.

FIG. 4B is a schematic diagram of an example terminal divided into sub-wallpapers. Because the upper border of this icon display area is the designated horizontal line in FIG. 4A, the distance between this upper border and the upper border of the desktop is represented as L. Based on the position on the desktop of the designated horizontal line in the icon display area, the terminal can determine a first straight line in the corresponding position in the scaled wallpaper image, such that the distance from this first straight line to the upper border of the scaled wallpaper image is also L. Thus, using this first straight line as the dividing line, the wallpaper image shown in FIG. 4B is divided into two sub-wallpaper sections. For purposes of discussion below, the sub-wallpaper section located in the upper portion will be referred to as the first wallpaper, and the sub-wallpaper section located in the lower portion will be referred to as the second wallpaper.

FIG. 4C is a schematic diagram of an example terminal displaying the icon display area. After the wallpaper image is divided into sub-wallpapers, the terminal uses the upper border of the icon display area (the designated horizontal line) as the dividing line to divide the desktop into two sub-desktop portions, where the desktop portion located in the upper portion being referred to as the first desktop, and the desktop portion located in the lower portion being referred to as the second desktop, and the terminal uses the first wallpaper as the wallpaper for the first desktop, and uses the second wallpaper as the wallpaper for the second desktop.

Because the upper border of the icon display area is the designated horizontal line, the distance from this designated horizontal line to the upper border of the icon display area is 0, and the distance by which the first desktop and its wallpaper are moved upward is 0. In other words, it is unnecessary to move the first desktop and its wallpaper, and it is only necessary to move the second desktop and its wallpaper downward such that the distance by which they are moved is the height of the icon display area (since the distance from the designated horizontal line to the lower border is exactly the height of the icon display area), in order to display the icon display area located between the first desktop and the second desktop. The display is intuitive to the user because what is being rendered is an area that is split open in the original desktop (including the wallpaper) to reveal the icon display area and the icons that have been added to the icon display area, and the lowest portion of the original desktop has been moved off the display area of the terminal screen.

In some cases, there may be one or more widget display images (e.g., a clock image) present on the desktop. Because widgets are also controlled by the operating system, the process used by the terminal to display the icon display area is similar to the desktop wallpaper rendering process, and includes the following: when a widget is present on the desktop, and the display area of this widget coincides with the designated horizontal line of this icon display area, the terminal retrieves the display data for this widget, and, based on the retrieved display data, draws a display image of this widget. Based on the position of the designated horizontal line of this icon display area in the display area of this widget, the terminal determines a second straight line in the corresponding location in the rendered display image, and, using the determined second straight line as the dividing line, divides the rendered display image into two sub-display images, displays the display image located in the upper portion in the sub-desktop located in the upper portion, and displays the display image located in the lower portion in the sub-desktop located in the lower portion. In other words, using a process similar to that used to divide the desktop image, the display image of the widget is divided into an upper and lower sub-display image, and, after the upper and lower sub-desktops are moved, a "split" is achieved to reveal the icon display area located between the two sub-desktops.

In addition to the aforementioned "splitting" technique to display the icon display area on the desktop, in various other embodiments, it is also possible to use other techniques to display the icon display area. For example, the icon display area can be set as a floating window in the upper portion of the desktop, and when the terminal receives a display command, this icon display area can be displayed in the form of a floating window; when a hide command is received, this icon display area is hidden, i.e., the floating window is not displayed.

Further, in the embodiments of the present application, internal multi-screen settings can be used for the icon display area; for example, because the size of the display area is limited, the internal settings may require that only one row of icons can be added to the display area of the icon display area, and a maximum number of icons (e.g., four icons) can be added to a row of icons. The user can enter a scroll screen command, and the terminal will switch to the next icon display area screen; in other words, in the next screen, the user can add an additional row of four icons. Additionally, an automatic squeezing technique can be employed to realize configuration of the icons added to the icon display area. Specifically, when the number of added icons exceeds the number of icons to be displayed in the icon display area, a newly added icon is automatically placed in the next icon display area screen.

In some embodiments, when the terminal is displaying the icon display area, if it receives a command to set a certain application icon as a hidden icon, then the application icon is placed in this icon display area, and the icon for this application that is displayed on the desktop is hidden; if it receives a command to set a certain application icon as a shortcut icon, then the application icon is placed in this icon display area, and this application icon is simultaneously displayed on the desktop.

In some embodiments, the terminal uses the operating system to monitor the operations executed by the user, in order to detect whether the user has entered commands to set a certain application icon as a hidden icon or a shortcut icon. In particular, when this icon display is only used as a hidden area, if it is detected that the user has executed an operation to drag a certain application icon to this icon display area, it is determined that a command to set this application icon as a hidden icon has been received; or, if it is detected that the time the user has pressed and held a certain application icon exceeds a set length of time (e.g., it is detected that the user has used a long press with respect to a certain application icon), the operating system will display a user interface widget (e.g., a hide button) in association with the application icon, and if it is detected that the user has clicked or selected the user interface widget, then a command to set the application icon as a hidden icon is deemed to have been received; wherein, the user can select the application icon from a pop-up application interface menu or select the application icon directly on the desktop so that the application icon can be hidden.

In some embodiments, shortcut icons can be stored in the icon display area. If it is detected that the user has executed an operation to drag a certain application icon to this icon display area (e.g., the user has pressed on the application icon with a fingertip and held down the fingertip to move the application icon on the screen to the icon display area), then it is determined that a command to set this application icon as a shortcut icon has been received; or, if it is determined that the time that the user has pressed and held a certain application icon exceeds a set length of time, it displays a user interface widget (e.g., a shortcut button), and if it is detected that the user has selected the user interface widget (e.g., clicked the shortcut button), it is determined that a command to set the application icon as a shortcut icon has been received; or, if it is detected that the user has clicked the button in the icon display area to add an application icon (for example, this button can be displayed as an icon in the form of a "+" sign or the like), and after detecting that the user has selected a certain application icon, it is determined that a command to set the application icon as a shortcut icon has been received; wherein, the user can select the application icon from a pop-up application interface menu or select the application icon directly on the desktop.

When this icon display area is used as a shortcut area, if the terminal detects that the user has pressed and held an application icon in excess of a set length of time, then a hide button and a shortcut button can be displayed. Further, if it is detected that the user has clicked the hide button, then it is determined that a command to set the application icon as a hidden icon has been received. Additionally, if it is detected that the user has clicked the shortcut button, it is determined that a command to set the application icon as a shortcut icon has been received.

To set certain application icons as shortcut application icons, in addition to manual selection by the user, the application icon can be set as shortcuts automatically based on information such as which applications have been used by the user recently or which applications are used more frequently. Specifically, the terminal can configure a set number of icons for applications recently opened by the user as shortcut application icons, and add them to the icon display area. The set number can be configured based on requirements and is set to 3 in some embodiments. The terminal can also configure application icons for which the number of times the user has operated the application and/or the total amount of operating time satisfies set conditions as shortcut application icons, and add them to the icon display area. For example, the terminal can set the icons of applications that have been opened three times or more within seven days as shortcut application icons.

Icons can be added to the icon display area in accordance with the above technique, and an inverse process can be used to delete icons that have been added to the icon display area. For example, when the terminal is displaying the icon display area, the user can drag icons in the desktop to the icon display area so the icons can be hidden, and can also drag icons in the icon display area to the desktop so the icons are not hidden. The operating system of the terminal generally supports a drag and drop operation of icons; after the container class corresponding to this icon display area is defined, this container class is registered in this dragging operation; when the terminal is displaying the icon display area, if it receives a command to drag an icon entered by the user, it can invoke the interface in this dragging system to realize dragging of an icon from one container into another container.

If an icon in the icon display area is deleted, then the functions of the application corresponding to this icon in association with the icon display area are also canceled; for example, if a hidden application icon is moved out of the icon display area, then the application corresponding to this icon is no longer hidden, i.e., the icon for this application resumes to be displayed on the desktop; if a shortcut application icon is moved out of the icon display area, then the application corresponding to the icon no longer functions as a shortcut application.

Figure 5:
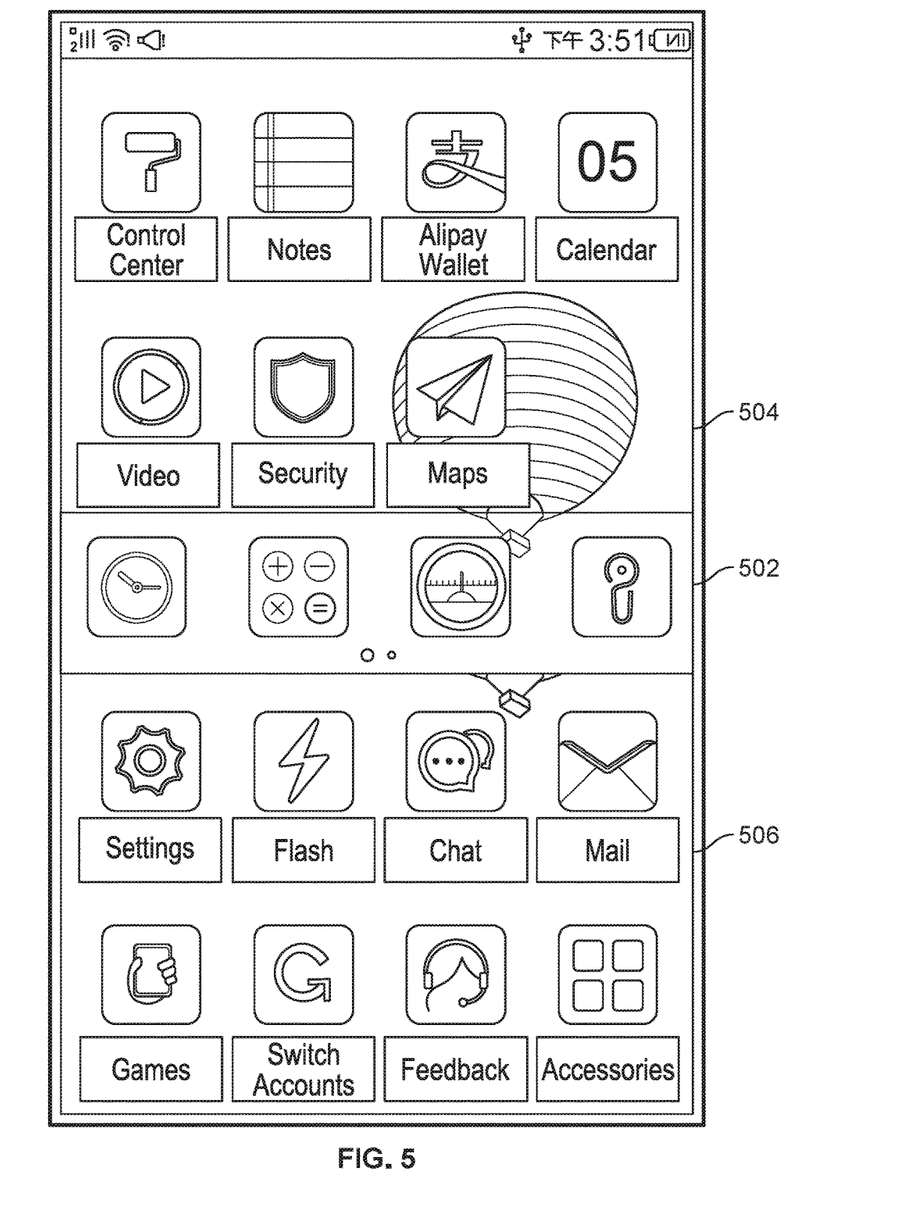
FIG. 5 is a screenshot of an example displayed icon display area offered in the embodiments of the present application.

FIG. 5 is a screenshot of an example displayed icon display area offered in the embodiments of the present application. The screenshot is an example taken from a mobile phone with an Android® system. In this example, an icon display area 502 is displayed, and the upper border of icon display area 502 serves as the designated horizontal line. In other words, it is not necessary to move sub-desktop 504 located in the upper portion and its wallpaper upward. Sub-desktop 506 located in the lower portion and its wallpaper are moved downward, the distance by which they are moved being the height of the icon display area. Further, because the height of the icon display area is slightly higher than the height of an icon, the DOCK area of the screen (which comprises a row of icons typically displayed at the bottom of the desktop) is moved off of the screen's display area.

For purposes of example, a terminal that is a touch screen device is discussed extensively in this application. The terminal can also be a personal computer (PC), a wearable device, or other client terminal. When the terminal is a PC, instead of detecting the user hand gesture operation, the operating system and/or display application implements a display button and a hide button, which are displayed on the desktop. When the user clicks the display button, the terminal determines that a display command has been received, and displays the icon display area; when the user clicks the hide button, the terminal determines that a hide command has been received, and hides this icon display area.

Figure 6:
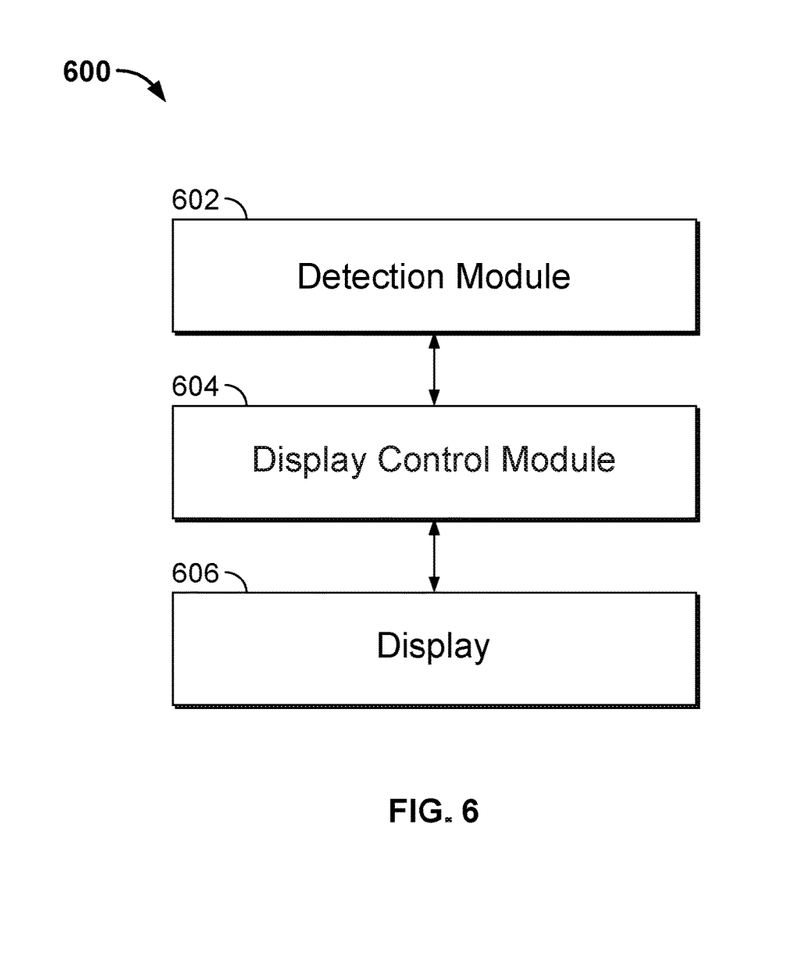
FIG. 6 is a block diagram of an example device that provides application icon management according to embodiments of the present application.

FIG. 6 is a block diagram of an example device that provides application icon management according to embodiments of the present application.

Figure 7:
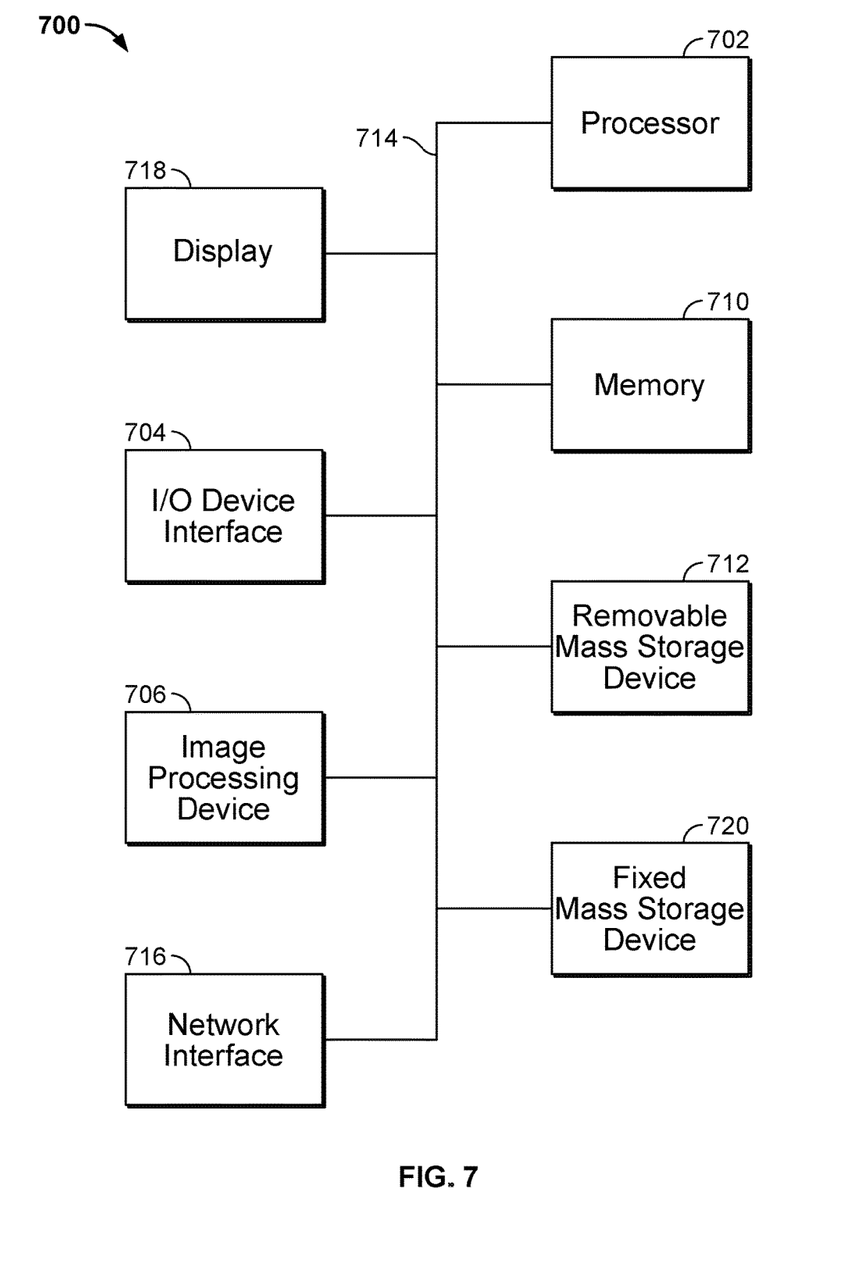
FIG. 7 is a functional diagram illustrating a programmed computer system for application icon display and management in accordance with some embodiments.

Device 600 can be included in a terminal such as 700 of FIG. 7.

Device 600 further comprises a detection module 602, configured to receive hide or display commands.

Device 600 further comprises a display control module 604 configured to, in the event that the command corresponds to a hide command and the icon display area is being displayed, hide the preset icon display area (and its associated application icons) from display 606. Display control module 604 is further configured to: in the event that the command corresponds to a display command and the icon display area is being hidden, display the icon display area and its associated application icons in display 606.

In this example, detection module 602 is configured to monitor user operations using the operating system. When the detection module detects that a user operation satisfies a first designated condition, it determines that a hide command has been received. In particular, when it is detected that the user has employed a two-point hand gesture operation, and the difference obtained by subtracting the distance between the initial positions of the two placements from the distance between the ending positions of the two placements does not exceed a set threshold value, then it is determined that the detected user operation satisfies a first designated condition.

Detection module 602 is further configured to determine that a user operation satisfies a second designated condition and that a display command has been received. In particular, when it is determined that the user has employed a two-point hand gesture operation, and the difference obtained by subtracting the distance between the initial positions of the two placements from the distance between the ending positions of the two placements is not less than a second threshold value, determine that the user operation perceived through monitoring satisfies a second designated condition.

In this example, the icon display area is a container class used to store and display icons.

In this example, an icon display area is located in a designated position on the desktop being displayed by display 606, the width of the icon display area is approximately the same as the width of the desktop, and the height of the icon display area is less than the height of the desktop.

The application icons contained in the icon display area include one or more hidden application icons and/or one or more shortcut application icons. A hidden application icon is an icon for which the display of the icon on the desktop is hidden, and a shortcut application icon is an icon that is simultaneously displayed on the desktop and in the icon display area.

If the icons contained in the icon display area include hidden application icons and shortcut application icons, then different identifiers are used to distinguish the hidden application icons and the shortcut application icons or the hidden application icons and the shortcut application icons are displayed in different areas of the icon display area.

Shortcut application icons comprise one or more of the following types: application icons selected by the user, application icons for a number of applications recently opened by the user, and application icons for applications for which the number of uses and/or the total operating time by the user satisfies preset conditions.

Detection module 602 is further used to detect and receive a command to set an application icon as a hidden icon and/or to receive a command to set an application icon as a shortcut icon.

In some embodiments, display control module 604 further includes an icon control module (not shown). When detection module 602 detects and receives a command to set an application icon as a hidden icon, the icon control module is configured to place the application icon in the icon display area, and hide the application icon displayed on the desktop. Additionally, when the detection module detects and receives a command to set an application icon as a shortcut icon, the icon control module is configured to place the application icon in the icon display area.

When detection module 602 detects that the user has executed an operation to drag the application icon to the icon display area, a command to set the application icon as a hidden icon is deemed to have been received. When detection module 602 detects that the time that the user has pressed and held the application icon exceeds a preset length of time, the icon control module will display a hide button. When the detection module detects that the user has clicked the hide button, it is determined that a command to set the application icon as a hidden icon has been received. When it is detected that the user has clicked the button to add an application icon to the icon display area, and after it is detected that the user has selected an application icon, it is further determined that a command to set this application icon as a hidden icon has been received.

When the detection module detects that the user has executed an operation to drag the application icon to the icon display area, it is further configured to determine that a command to set the application icon as a shortcut icon has been received; or, when it is determined that the time the user has pressed and held the application icon exceeds a set length of time, the display control module will display a shortcut button, and, when it is detected that the user has clicked the shortcut button, the detection module is further configured to determine that a command to set the application icon as a shortcut icon has been received; or, when it is detected that the user has clicked the button to add an application icon to the icon display area, and after it is detected that the user has selected an application icon, the detection module is further configured to determine that a command to set this application icon as a shortcut icon has been received.

Display 606 is configured to display the icon display area on the desktop or to display the icon display area in the form of a floating window, wherein, the icon display area is located in a designated position on the desktop, the width of the icon display area is not greater than the width of the desktop, and the height of the icon display area is less than the height of the desktop.

Display control module 604 and display 606 are configured to cooperate and perform the following functions: to retrieve the wallpaper data of the desktop, and, based on the retrieved wallpaper data, to draw a wallpaper image, and scale the drawn wallpaper image to the dimensions of the desktop if needed; based on the position on the desktop of the designated horizontal line in the icon display area, to determine a first straight line in a corresponding position in the scaled wallpaper image; to use the determined first straight line as the dividing line to divide the scaled wallpaper image into two sub-wallpaper images; to use the designated horizontal line in the icon display area as the dividing line, to divide the desktop into two sub-desktops; to use the sub-wallpaper image located in the upper portion as the wallpaper for the sub-desktop located in the upper portion, and use the sub-wallpaper image located in the lower portion as the wallpaper for the sub-desktop located in the lower portion; to move the sub-desktop located in the upper portion and its wallpaper upward, the distance by which they are moved upward being the distance from the designated horizontal line to the upper border of the icon display area; and/or, to move the sub-desktop located in the lower portion and its wallpaper downward, the distance by which they are moved downward being the distance from the designated horizontal line to the lower border of the icon display area; and to display the icon display area located between the two desktops.

When a widget is present on the desktop, and the display area of the widget coincides with the designated horizontal line in the icon display area, display control module 604 and display 606 are configured to cooperate and to retrieve the display data of the widget, and, based on the retrieved display data, to draw a display image of the widget; based on the position of the designated horizontal line contained in the icon display area in the display area of the widget, to determine a second straight line in a corresponding position in the drawn display image; using the determined second straight line as the dividing line, to divide the drawn display image into two sub-display images, and display the sub-display image located in the upper portion in the sub-desktop located in the upper portion, and display the sub-display image located in the lower portion in the sub-desktop located in the lower portion.

The modules described above can be implemented as software code executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

FIG. 7 is a functional diagram illustrating a programmed computer system for application icon display and management in accordance with some embodiments. As will be apparent, other computer system architectures and configurations can be used to perform the described application icon display and management technique. Computer system 700, which includes various subsystems as described below, includes at least one microprocessor subsystem (also referred to as a processor or a central processing unit (CPU) 702). For example, processor 702 can be implemented by a single-chip processor or by multiple processors. In some embodiments, processor 702 is a general purpose digital processor that controls the operation of the computer system 700. In some embodiments, processor 702 also includes one or more coprocessors or special purpose processors (e.g., a graphics processor, a network processor, etc.). Using instructions retrieved from memory 710, processor 702 controls the reception and manipulation of input data received on an input device (e.g., image processing device 706, I/O device interface 704), and the output and display of data on output devices (e.g., display 718). In some embodiments, processor 702 includes and/or is used to implement the modules described above in connection with FIG. 6 and/or execute/perform the processes described above in connection with FIG. 1.

Processor 702 is coupled bi-directionally with memory 710, which can include, for example, one or more random access memories (RAM) and/or one or more read-only memories (ROM). As is well known in the art, memory 710 can be used as a general storage area, a temporary (e.g., scratch pad) memory, and/or a cache memory. Memory 710 can also be used to store input data and processed data, as well as to store programming instructions and data, in the form of data objects and text objects, in addition to other data and instructions for processes operating on processor 702. Also as is well known in the art, memory 710 typically includes basic operating instructions, program code, data, and objects used by the processor 702 to perform its functions (e.g., programmed instructions). For example, memory 710 can include any suitable computer readable storage media described below, depending on whether, for example, data access needs to be bi-directional or uni-directional. For example, processor 702 can also directly and very rapidly retrieve and store frequently needed data in a cache memory included in memory 710.

A removable mass storage device 712 provides additional data storage capacity for the computer system 700, and is optionally coupled either bi-directionally (read/write) or uni-directionally (read only) to processor 702. A fixed mass storage 720 can also, for example, provide additional data storage capacity. For example, storage devices 712 and/or 720 can include computer readable media such as magnetic tape, flash memory, PC-CARDS, portable mass storage devices such as hard drives (e.g., magnetic, optical, or solid state drives), holographic storage devices, and other storage devices. Mass storages 712 and/or 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can be used to provide access to other subsystems and devices as well. As shown, these can include a display 718, a network interface 716, an input/output (I/O) device interface 704, an image processing device 706, as well as other subsystems and devices. For example, image processing device 706 can include a camera, a scanner, etc.; I/O device interface 704 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 700. Multiple I/O device interfaces can be used in conjunction with computer system 700. The I/O device interface can include general and customized interfaces that allow the processor 702 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 716 allows processor 702 to be coupled to another computer, computer network, or telecommunications network using a network connection as shown. For example, through the network interface 716, the processor 702 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 704 and display 718 share the touch sensitive screen component, which both detects user inputs and displays outputs to the user). In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   displaying a first set of one or more application icons in a desktop display area, wherein the desktop display area includes an icon display area, the icon display area being in either a displayed state or a hidden state;
   receiving a first command;
   in response to a second set of one or more application icons in the icon display area being displayed and the first command corresponding to a hide command, hiding the icon display area such that the second set of one or more application icons is not visible on the desktop display area; and
   in response to the second set of one or more application icons in the icon display area not being displayed and a second command corresponding to a display command being received, displaying the icon display area such that the second set of one or more application icons in the icon display area is visible on the desktop display area including:
   retrieving display data of the desktop display area;
   drawing a display image based on the retrieved display data;
   based on a location on the desktop display area of a designated horizontal line in the icon display area, determining a dividing line in a corresponding position in the display image;
   dividing the display image into two sub-display images using the dividing line;
   dividing the desktop display area into two sub-desktops using the designated horizontal line in the icon display area as the dividing line, wherein a sub-display image located in an upper portion is used as a display image for a sub-desktop located in the upper portion, and a sub-display image located in a lower portion is used as a display image for a sub-desktop located in the lower portion; and
   moving the sub-desktop located in the upper portion and its corresponding sub-display image upward, moving the sub-desktop located in the lower portion and its corresponding sub-display image downward, or both, such that the icon display area is displayed at a region located between the sub-desktop in the upper portion and the sub-desktop in the lower portion.

2. The method of claim 1, wherein:
   the first command and the second command are received by monitoring user operations and detecting a pre-specified user operation; and
   the first command is deemed to correspond to a hide command in response to the pre-specified user operation satisfying a first designated condition.

3. The method of claim 2, wherein:
   the pre-specified user operation includes a two-point hand gesture operation; and
   the pre-specified user operation is deemed to satisfy the first designated condition in response to a difference between a distance of initial placement positions and a distance of ending placement positions not exceeding a first set threshold value.

4. The method of claim 2, wherein the second command is deemed to correspond to a display command in response to the pre-specified user operation satisfying a second designated condition.

5. The method of claim 4, wherein:
   the pre-specified user operation includes a two-point hand gesture; and
   the pre-specified user operation is deemed to satisfy the second designated condition in response to a difference between a distance of initial placement positions and a distance of ending placement positions not less than a second set threshold value.

6. The method of claim 1, wherein the icon display area is implemented as a container class.

7. The method of claim 1, wherein:
   the icon display area is located within a desktop;
   a width of the icon display area is not greater than a width of the desktop; and
   a height of the icon display area is not greater than a height of the desktop.

8. The method of claim 1, wherein the second set of one or more application icons includes a hidden application icon, a shortcut application icon, or both.

9. The method of claim 8, wherein the hidden application icon and the shortcut application icon are identified using different types of identifiers.

10. The method of claim 8, wherein the hidden application icon and the shortcut application icon are displayed in different areas of the icon display area.

11. The method of claim 8, wherein the shortcut application icon is determined by:
a manual selection by a user;
an automatic selection of an application icon recently opened by the user;
an automatic selection of an application icon for which a number of uses, an amount of operating time, or both satisfy one or more preset conditions; or
a combination thereof.

12. The method of claim 1, further comprising receiving a third command to set an application icon as a hidden icon.

13. The method of claim 12, wherein the receiving the third command to set the application icon as a hidden icon includes detecting that a user has executed an operation to drag the application icon to the icon display area.

14. The method of claim 12, wherein the receiving the third command to set the application icon as a hidden icon includes displaying a user interface widget to hide the application icon and detecting a user selection of the user interface widget to hide the application icon.

15. The method of claim 1, further comprising receiving a fourth command to set an application icon as a shortcut icon.

16. The method of claim 15, wherein the receiving the fourth command to set the application icon as a shortcut icon includes detecting that a user has executed an operation to drag the application icon to the icon display area.

17. The method of claim 15, wherein the receiving the fourth command to set the application icon as a shortcut icon includes displaying a user interface widget to generate the shortcut icon for the application icon and detecting a user selection of the user interface widget to generate the shortcut icon.

18. The method of claim 1, wherein the icon display area is displayed in the form of a floating window.

19. The method of claim 1, wherein the display data includes wallpaper display data or widget display data.

20. A system, comprising:
one or more computer processors configured to:
cause a first set of one or more application icons to be displayed in a desktop display area, wherein the desktop display area includes an icon display area, the icon display area being in either a displayed state or a hidden state;
receive a first command;
in response to a second set of one or more application icons in the icon display area being displayed and the first command corresponding to a hide command, cause the icon display area to be hidden such that the second set of one or more application icons is not visible on the desktop display area; and
in response to the second set of one or more application icons in the icon display area not being displayed and a second command corresponding to a display command being received, cause the icon display area to be displayed such that the second set of one or more application icons in the icon display area is visible on the desktop display area including to:
retrieve display data of the desktop display area;
draw a display image based on the retrieved display data;
based on a location on the desktop display area of a designated horizontal line in the icon display area, determine a dividing line in a corresponding position in the display image;
divide the display image into two sub-display images using the determined dividing line;
divide the desktop display area into two sub-desktops using the designated horizontal line in the icon display area as the dividing line, wherein a sub-display image located in an upper portion is used as a display image for a sub-desktop located in the upper portion, and a sub-display image located in a lower portion is used as a display image for a sub-desktop located in the lower portion; and
move the sub-desktop located in the upper portion and its corresponding sub-display image upward, moving the sub-desktop located in the lower portion and its corresponding sub-display image downward, or both, such that the icon display area is displayed at a region located between the sub-desktop in the upper portion and the sub-desktop in the lower portion; and
one or more memories coupled to the one or more computer processors, the one or more memories configured to provide the one or more computer processors with instructions.

21. A computer program product embodied in a tangible non-transitory computer readable storage medium and comprising computer instructions for:
displaying a first set of one or more application icons in a desktop display area, wherein the desktop display area includes an icon display area, the icon display area being in either a displayed state or a hidden state;
receiving a first command;
in response to a second set of one or more application icons in the icon display area being displayed and the first command corresponding to a hide command, hiding the icon display area such that the second set of one or more application icons is not visible on the desktop display area; and
in response to the second set of one or more application icons in the icon display area not being displayed and a second command corresponding to a display command being received, displaying the icon display area such that the second set of one or more application icons in the icon display area is visible on the desktop display area including:
retrieving display data of the desktop display area;
drawing a display image based on the retrieved display data;
based on a location on the desktop display area of a designated horizontal line in the icon display area, determining a dividing line in a corresponding position in the display image;
dividing the display image into two sub-display images using the determined dividing line;
dividing the desktop display area into two sub-desktops using the designated horizontal line in the icon display area as the dividing line, wherein a sub-display image located in an upper portion is used as a display image for a sub-desktop located in the upper portion, and a sub-display image located in a lower portion is used as a display image for a sub-desktop located in the lower portion; and
moving the sub-desktop located in the upper portion and its corresponding sub-display image upward, moving the sub-desktop located in the lower portion and its corresponding sub-display image downward, or both, such that the icon display area is displayed at a region located between the sub-desktop in the upper portion and the sub-desktop in the lower portion.

* * * * *